(12) United States Patent
Geng

(10) Patent No.: US 6,556,706 B1
(45) Date of Patent: Apr. 29, 2003

(54) THREE-DIMENSIONAL SURFACE PROFILE IMAGING METHOD AND APPARATUS USING SINGLE SPECTRAL LIGHT CONDITION

(75) Inventor: Z. Jason Geng, 11001 Sugarbush Ter., Rockville, MD (US) 20852

(73) Assignee: Z. Jason Geng, Rockville, MD (US)

( * ) Notice: Subject to any disclaimer, the term of this patent is extended or adjusted under 35 U.S.C. 154(b) by 248 days.

(21) Appl. No.: 09/770,124

(22) Filed: Jan. 26, 2001

Related U.S. Application Data

(60) Provisional application No. 60/178,695, filed on Jan. 28, 2000.

(51) Int. Cl.⁷ .................................................. G06K 9/00
(52) U.S. Cl. ......................... 382/154; 356/375; 356/376
(58) Field of Search ................................ 382/154, 190, 382/163, 164, 165, 104; 348/47, 154; 356/357, 376, 606

(56) References Cited

U.S. PATENT DOCUMENTS 5,090,811 A * 2/1992 Donaldson .................. 356/376
5,471,303 A * 11/1995 Ai et al. ...................... 356/357
6,028,672 A    2/2000 Geng
6,147,760 A   11/2000 Geng
6,252,623 B1 * 6/2001 Lu et al. ....................... 348/47

FOREIGN PATENT DOCUMENTS

WO    WO 00/70303    11/2000

* cited by examiner

Primary Examiner—Timothy M. Johnson
Assistant Examiner—Abolfazl Tabatabai
(74) Attorney, Agent, or Firm—Steven L. Nichols; Paul W. Fish; Rader, Fishman & Grauer PLLC

(57) ABSTRACT

A three-dimensional surface profile imaging method and system uses a single spectral light illumination constraint to guarantee consistent RGB values corresponding to a given light spectrum, regardless of the surface reflectance characteristics of the object being imaged. In one embodiment, each light sheet projected onto the object contains only a single wavelength. As a result, the spectral composition of the projected light at any surface point of the object will be independent of the light intensity and the reflectance characteristics of the surface.

16 Claims, 1 Drawing Sheet

THREE-DIMENSIONAL SURFACE PROFILE IMAGING METHOD AND APPARATUS USING SINGLE SPECTRAL LIGHT CONDITION

REFERENCE TO RELATED APPLICATIONS

This application claims the benefit of U.S. Provisional Appln. No. 60/178,695, filed Jan. 28, 2000, the disclosure of which is incorporated herein by reference in its entirety.

BACKGROUND OF THE INVENTION

1. Field of the Invention

The present invention is directed to three-dimensional surface profile imaging, and more particularly to a method and apparatus for three-dimensional imaging that uses color ranging to conduct surface profile measurement.

2. Description of the Related Art

A three dimensional surface profile imaging method and apparatus described in U.S. Pat. No. 5,675,407 ("the '407 patent"), the disclosure of which is incorporated herein by reference in its entirety, conducts imaging by projecting light through a linear variable wavelength filter (LVWF), thereby projecting light having a known, spatially distributed wavelength spectrum on the objects being imaged. The LVWF is a rectangular optical glass plate coated with a color-filtering film that gradually varies in color, (i.e., wavelength). If the color spectrum of a LVWF is within the visible light region, one edge of the filter rectangle may correspond to the shortest visible wavelength (i.e. blue or violet) while the opposite edge may correspond to the longest visible wavelength, (i.e. red). The wavelength of light passing through the coated color-filtering layer is linearly proportional to the distance between the position on the filter glass where the light passes and the blue or red edge. Consequently, the color of the light is directly related to the angle $\theta$, shown in FIG. 1, at which the light leaves the rainbow projector and LVWF.

Referring to FIGS. 1 and 2 in more detail, the imaging method and apparatus is based on the triangulation principle and the relationship between a light projector 100 that projects through the LVWF 101, a camera 102, and the object or scene being imaged 104. As shown in FIG. 1, a triangle is uniquely defined by the angles theta ($\theta$) and alpha ($\alpha$), and the length of the baseline (B). With known values for $\theta$, $\alpha$, and B, the distance (i.e., the range R) between the camera 102 and a point Q on the object's surface can be easily calculated. Because the baseline B is predetermined by the relative positions of the light projector 100 and the camera 102, and the value of $\alpha$ can be calculated from the camera's geometry, the key to the triangulation method is to determine the projection angle, $\theta$, from an image captured by the camera 102 and more particularly to determine all $\theta$ angles corresponding to all the visible points on an object's surface in order to obtain a full-frame 3D image in one snapshot.

FIG. 2 is a more detailed version of FIG. 1 and illustrates the manner in which all visible points on the object's surface 104 is obtained via the triangulation method. As can be seen in the Figure, the light projector 100 generates a fan beam of light 200. The fan beam 200 is broad spectrum light (i.e., white light) which passes through the LVWF 101 to illuminate one or more three-dimensional objects 104 in the scene with a pattern of light rays possessing a rainbow-like spectrum distribution. The fan beam of light 200 is composed of multiple vertical planes of light 202, or "light sheets", each plane having a given projection angle and wavelength. Because of the fixed geometric relationship among the light source 100, the lens of the camera 102, and the LVWF 101, there exists a one-to-one correspondence between the projection angle ($\theta$) of the vertical plane of light and the wavelength ($\lambda$) of the light ray. Note that although the wavelength variations are shown in FIG. 2 to occur from side to side across the object 104 being imaged, it will be understood by those skilled in the art that the variations in wavelength could also be made from top to bottom across the object 104 or scene being imaged.

The light reflected from the object 104 surface is then detected by the camera 102. If a visible spectrum range LVWF (400–700 nm) is used, the color detected by the camera pixels is determined by the proportion of its primary color Red, Green, and Blue components (RGB). The color spectrum of each pixel has a one-to-one correspondence with the projection angle ($\theta$) of the plane of light due to the fixed geometry of the camera 102 lens and the LVWF 101 characteristics. Therefore, the color of light received by the camera 102 can be used to determine the angle $\theta$ at which that light left the light projector 100 through the LVWF 101.

As described above, the angle $\alpha$ is determined by the physical relationship between the camera 102 and the coordinates of each pixel on the camera's imaging plane. The baseline B between the camera's 102 focal point and the center of the cylindrical lens of the light projector 100 is fixed and known. Given the value for angles $\alpha$ and $\theta$, together with the known baseline length B, all necessary information is provided to easily determine the full frame of three-dimensional range values (x,y,z) for any and every visible spot on the surface of the objects 104 seen by the camera 102.

As shown in FIG. 3, given the projection angle $\theta$, the three-dimensional algorithm for determining the (x,y,z) coordinates of any surface spot Q(x,y,z) on a three-dimensional object is given below based on the following triangulation principle:

$$x = \frac{B}{f * ctg\theta - u} * u, \quad (1)$$

$$y = \frac{B}{f * ctg\theta - u} * v,$$

$$z = \frac{B}{f * ctg\theta - u} * f$$

As a result, the three-dimensional imaging system described above can capture full-frame, high spatial resolution three-dimensional images using a standard camera, such as a charge coupled device camera, in real time without relying on any moving parts. Further, because the imaging system does not rely on a laser, it does not pose any hazard to the eyes when used in clinical applications. Also, because the wavelength of the light projected onto the object surface continuously varies, there is no theoretical limitation on the measurement accuracy that can be achieved by the system. The actual accuracy of a specific system will depend on system implementation and will be affected primarily by limiting factors such as the optical system design, the quality and resolution of the camera, light spectral emission of the light source projector; noise level and resolution of the frame grabber, calibration algorithms, and the three-dimensional imaging processing algorithms.

To avoid allowing the surface color of the object being imaged from affecting the imaging results, the system may obtain an image of the object under normal light conditions before projecting the filtered light onto the object. The image obtained under normal light conditions is then subtracted from the image obtained under LVWF light conditions to eliminate the effects of the object color on the image.

Even when the system compensates for the color of the object, however, the consistency of the spectral power distribution and the RGB value of each pixel may vary when light is projected onto the object through the LVWF based on the reflection characteristics of the object's surface, particularly if the object is not white and/or not uniformly colored.

There is a need for a surface profile imaging method and apparatus that is able to generate consistent RGB values regardless of the reflection characteristics of the surface being imaged.

SUMMARY OF THE INVENTION

Accordingly, the present invention is directed to a method and apparatus for three-dimensional surface imaging that avoids variations in the RGB value of each pixel due to the reflection characteristics of the object's surface. More particularly, a light source in the system illuminates an object or scene with a light pattern having a spatially varying wavelength and composed of at least one light plane. The light plane corresponds to at least one angle at which the light of that wavelength is emitted and contains only a single spectral component.

By imposing a single spectral light condition on the light source, the RGB values of each pixel will be independent of the light intensity of the light source and the reflectance characteristics of the object or scene being imaged. As a result, any color matching function that is conducted to link the wavelength of the light projected on the object or scene at a given point and that point's position will be consistent, regardless of the color and/or reflectance characteristics of the object's or scene's surface.

DESCRIPTION OF THE PREFERRED EMBODIMENT

Figure 1:
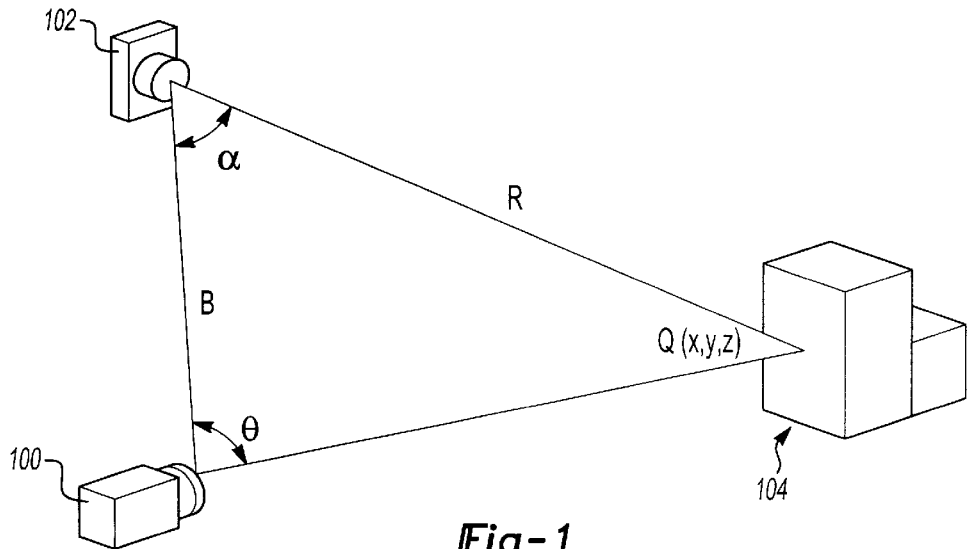
FIG. 1 is a simplified diagram illustrating a triangulation principle used in the present invention.
Figure 2:
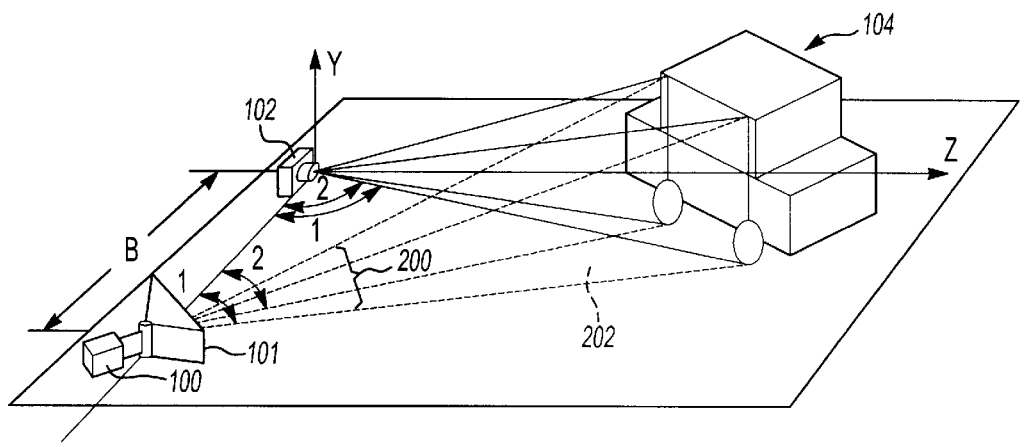
FIG. 2 is a representative diagram of the components used by the inventive system.
Figure 3:
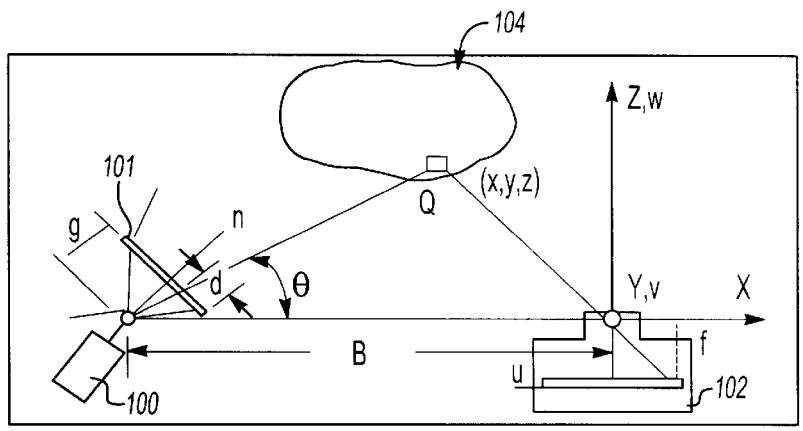
FIG. 3 is a plan view of the system shown in FIG. 2.

Generally, the inventive system and method system ensures that the RGB values corresponding to a given spectral composition $f(\lambda)$ are consistent, regardless of the reflectance characteristics of the surface being imaged. By way of background, the invention recognizes that the spectral composition $f(\lambda)$ of the light source 100 is a parameter that is controllable in the system shown in FIG. 2. Because this parameter is controllable, imposing a restrictive condition on $f(\lambda)$ can make the RGB values consistent for $f(\lambda)$, regardless of $r(\lambda)$ and $s(\lambda)$. This will be explained in greater detail below.

In a monochrome camera, the pixel values are computed from the integral of the spectral power distribution (SPD) of the light measured by a charge coupled device (CCD) element in the camera 102. If the camera 102 receives light directly from a light source, a given pixel in the CCD element of the camera 102 generates output value p by summing the amount of light $f(\lambda)$ received by the pixel at each wavelength, weighted by the responsiveness of the camera pixel to a given wavelength, $s(\lambda)$. That is:

$$p = \int_{\lambda_{min}}^{\lambda_{max}} f(\lambda)s(\lambda)d\lambda \quad (2)$$

where $f(\lambda)$ is the spectral composition (spectral power distribution) of illumination source; $s(\lambda)$ is the spectral sensitivity function of the sensor; and $\lambda$ max and $\lambda$ min are the upper and lower bounds of the wavelengths visible to CCD pixels in the CCD elements.

When the camera 102 is used to obtain images of real world objects, where the light source position may not be controllable, the reflectance characteristics of the surface of the objects will affect the pixel values because the camera 102 will not receive light directly from the light source in most real-world cases. The pixel value p in this case is a integral of the amount of light $f(\lambda)$ received by the pixel of the camera at each wavelength, weighted by the surface reflectance function of the object, $r(\lambda)$, weighted further by the responsiveness of the camera pixel to various wavelength, $s(\lambda)$. That is:

$$p = \int_{\lambda_{min}}^{\lambda_{max}} f(\lambda)r(\lambda)s(\lambda)d\lambda \quad (3)$$

where $r(\lambda)$ is the surface spectral reflectance function of the object in the scene 104.

If the camera 102 is a CCD camera rather than a monochrome camera, color filters are interposed between the incoming illumination and the pixel element of the camera 102. Each filter has a transmittance function $\tau(\lambda)$, specifying the fraction of light transmitted at each wavelength. Thus, the pixel value is specified by the above integral with $s(\lambda)$ replaced by $\tau(\lambda) s(\lambda)$. Typically, three color filters (Red, Green, and Blue) are used in a color CCD camera with transmittance $\tau_r(\lambda)$, $\tau_g(\lambda)$, and $\tau_b(\lambda)$, respectively. More particularly, the respective spectral sensitivity functions of the sensor for each primary color is as follows:

$$s_r(\lambda)=\tau_r(\lambda)s(\lambda), \; s_g(\lambda)=\tau_g(\lambda)s(\lambda), \; s_b(\lambda)=\tau_b(\lambda)s(\lambda) \quad (4)$$

As a result, the RGB value of each pixel of a color camera can be computed by the expression:

$$\begin{bmatrix} R \\ G \\ B \end{bmatrix} = \begin{bmatrix} \int_{\lambda_{min}}^{\lambda_{max}} f(\lambda)r(\lambda)s_r(\lambda)d\lambda \\ \int_{\lambda_{min}}^{\lambda_{max}} f(\lambda)r(\lambda)s_g(\lambda)d\lambda \\ \int_{\lambda_{min}}^{\lambda_{max}} f(\lambda)r(\lambda)s_b(\lambda)d\lambda \end{bmatrix} \quad (5)$$

Equation (5) is a general formula of image formation and pixel value computation of color CCD cameras. More particularly, equation (5) illustrates the relationship among the reflection characteristics of object surface, sensitivity function of CCD pixels, light spectrum of active illumination source, and the signal output of the camera as well as shows the effect of the surface reflectance function $r(\lambda)$ plays on the CCD image formation.

As can be seen in equation (5), the RGB value of a CCD pixel is an integral function of three spectral power distribution functions, i.e., spectral composition of active illumination source $f(\lambda)$, surface reflectance function $r(\lambda)$, and sensitivity function of the CCD camera pixel $s(\lambda)$. Even if r(λ) and s(λ) are known, it is generally not possible to uniquely determine f(λ) based on a single set of RGB values to determine the projection angle corresponding to each pixel. Further, in many applications, information about the surface reflectance r(λ) is not available, making determination of f(λ) even more unlikely.

Note, however, that it is not necessary when using a LVWF 101 in the imaging system to recover explicitly the function form of f(λ) based on RGB values, due to the color matching scheme used to determine the projection angle. Instead, the detected light spectrum is compared with values pre-stored in a look-up table in the camera's processor or in a separate processor coupled to the camera to get a corresponding projection angle. In this case, the spectrum of projected light is only used as an information carrier for the projection angle of the light sheet. As long as the CCD camera can provide the same RGB values for the same projected light illumination (with various reflectance functions r(λ)), the specific form of the function f(λ) is not important. Instead, consistency of RGB values corresponding to light spectrum of f(λ), regardless of the surface reflectance function r(λ), has greater importance because the consistency facilitates color matching.

With both f(λ) and r(λ) being freely variable, however, the consistency of RGB values corresponding to f(λ) is difficult to achieve, thereby making color matching difficult, particularly because differences in the surface characteristics (e.g., surface color, reflectivity of the surface material, non-uniform surface color, etc.) will change the RGB values.

To restrict the spectral composition f(λ), the inventive system imposes a "single spectral light condition" to the light projector 100 to guarantee the consistency of RGB values corresponding to light spectrum of f(λ), regardless of the surface reflectance function r(λ). Under this condition, each individual light sheet projected by the light projector 100 contains only a single wavelength spectral component. More particularly, the spectral composition of the projected light at any single surface point on the object 104 being imaged can be expressed by the following function:

$$f(\lambda) = m_0 \delta(\lambda - \lambda_0) \tag{6}$$

where $m_0$ is a variable indicating the magnitude of the light intensity and $\lambda_0$ is the wavelength of the single wavelength light impinged on a given surface spot.

Under this single spectral light illumination condition, the normalized RGB values (r,g,b) of a color camera are independent of the intensity of the spectral light $m_0$ as well as the surface reflectance function r(λ) as long as they are both non-zero. More particularly, under the single spectral light illumination condition, the spatially varying wavelength light source from the light projector 100 shown in FIG. 2 produces only single spectral light at each surface point on the object being imaged. Due to the property of the delta function of a single wavelength spectral light shown in equation (6), the pixel value p for each pixel in the generated image is:

$$p = m_0 r(\lambda_0) s(\lambda_0) \tag{7}$$

where $\lambda_0$ is the wavelength of the single wavelength light impinged on the surface spot observed by the CCD pixel.

Based on equation (7), the R, G, and B values of each pixel therefore can be expressed as:

$$\begin{bmatrix} R \\ G \\ B \end{bmatrix} = m_0 r(\lambda_0) \begin{bmatrix} s_r(\lambda_0) \\ s_g(\lambda_0) \\ s_b(\lambda_0) \end{bmatrix} \tag{8}$$

The wavelength information of projected light is embedded in the normalized RGB values of each pixel. Assuming that both $m_0$ and $r(\lambda_0)$ are non-zero, the normalized RGB values are expressed as follows:

$$\begin{bmatrix} r \\ g \\ b \end{bmatrix} = \frac{1}{\sqrt{R^2 + G^2 + B^2}} \begin{bmatrix} R \\ G \\ B \end{bmatrix} = \frac{1}{\sqrt{s_r(\lambda_0)^2 + s_g(\lambda_0)^2 + s_b(\lambda_0)^2}} \begin{bmatrix} s_r(\lambda_0) \\ s_g(\lambda_0) \\ s_b(\lambda_0) \end{bmatrix} \tag{9}$$

As can be seen in equation (9), the normalized RGB values, r, g, and b are independent of $m_0$ and $r(\lambda_0)$.

Under the single spectrum light condition, then, the wavelength information of reflected light captured by a camera 102 in the form of normalized RGB values depends solely on the sensitivity function of the camera 102, regardless of the light intensity and surface reflectance characteristics of the object 104 being imaged. The sensitivity function of the camera 102, which indicates the responsiveness of a given camera pixel to various wavelengths, can be obtained from the camera manufacturer or through calibration procedures. Based on the normalized RGB data and the known sensitivity function of a camera 102, one can uniquely determine the corresponding wavelength of the light projected onto the object 104. The three-dimensional characteristics of the object are then obtained as explained in, for example, U.S. Pat. No. 5,675,407 to obtain the three-dimensional range information of the object 104. Note that because of the single spectral light condition restriction, the color matching process used to obtain the surface information will work, regardless of whether the object surfaces are pure white, non-white, uniformly colored, mixed colored, or even speckled.

Note that although the above description focuses on using visible light for conducting the three-dimensional surface imaging, infrared (IR) or ultra-violet (UV) light sources with suitable wavelength sensitive detectors can also be used for special applications with minimal modification of the imaging system. These applications will not be specifically addressed herein, but will be readily practicable by those skilled in the art based on the principles disclosed herein.

While the invention has been specifically described in connection with certain specific embodiments thereof, it is to be understood that this is by way of illustration and not of limitation, and the scope of the appended claims should be construed as broadly as the prior art will permit.

What is claimed is:

1. A device for creating a three-dimensional profile of an object or scene being imaged, the device comprising:
   a light source for illuminating said object or scene with a light pattern having at least one light plane, wherein said light pattern varies in wavelength spatially across said object or scene, and wherein said at least one light plane corresponds to at least one angle at which light of that wavelength is emitted by said light source and contains only a single spectral component;
   a camera for imaging said object or scene as illuminated with said light pattern; and
   a processor for calculating a distance to a point on said object or in said scene based on a baseline distance between said light source and said camera, an angle between said camera and said baseline, and an angle at which light striking the point is emitted by said light source as determined from red/green/blue (RGB) values corresponding to the wavelength of the light striking the point.

2. The device of claim 1, wherein the single spectral component is based on a light intensity value of the light source and the wavelength emitted by said light source.

3. The device of claim 2, wherein the RGB values depend on a sensitivity function of the camera and are independent of the light intensity of the light source and a surface reflectance of the object or scene.

4. The device of claim 1, wherein said light pattern varies over a visible light spectrum.

5. The device of claim 1, wherein said light pattern varies over an infrared light spectrum.

6. The device of claim 1, wherein said light pattern varies over an ultraviolet light spectrum.

7. The device of claim 1, wherein the processor calculates the distance to the point by triangulation of the baseline distance between said light source and said camera, the angle between said camera and said baseline, and the angle at which light striking the point is emitted by said light source.

8. A device for creating a three-dimensional profile of an object or scene being imaged, the device comprising:

a light source for illuminating said object or scene with a light pattern having a plurality of light planes, wherein said light pattern varies in wavelength spatially across said object or scene, and wherein each of said plurality of light planes corresponds to at least one angle at which light of that wavelength is emitted by said light source and contains only a single spectral component, the single spectral component being based on a light intensity value of the light source and the wavelength emitted by said light source for one of said light planes;

a camera for imaging said object or scene as illuminated with said light pattern; and a processor for calculating a distance to a point on said object or in said scene using triangulation based on a baseline distance between said light source and said camera, an angle between said camera and said baseline, and an angle at which light striking the point is emitted by said light source as determined from red/green/blue (RGB) values corresponding to the wavelength of the light striking the point, wherein the RGB values depend on a sensitivity function of the camera and are independent of the light intensity of the light source and a surface reflectance of the object or scene.

9. The device of claim 8, wherein said light pattern varies over a visible light spectrum.

10. The device of claim 8, wherein said light pattern varies over an infrared light spectrum.

11. The device of claim 8, wherein said light pattern varies over an ultraviolet light spectrum.

12. A method for creating a three-dimensional profile of an object or scene being imaged, the method comprising the steps of:

illuminating the object or scene with a light pattern having a plurality of light planes, wherein said light pattern varies in wavelength spatially across said object or scene, and wherein said at least one light plane corresponds to at least one angle at which light of that wavelength is emitted and contains only a single spectral component;

imaging said object or scene as illuminated in said illuminating step;

calculating a distance to a point on said object or in said scene using triangulation based on a baseline distance between said light source and said camera, an angle between said camera and said baseline, and an angle at which light striking the point is emitted by said light source as determined from red/green/blue (RGB) values corresponding to the wavelength of the light striking the point.

13. The method of claim 12, wherein the RGB values depend on a sensitivity function of the camera and are independent of the light intensity of the light source and a surface reflectance of the object or scene.

14. The method of claim 12, wherein the illuminating step varies the light pattern over a visible light spectrum.

15. The method of claim 12, wherein the illuminating step varies the light pattern over an infrared light spectrum.

16. The method of claim 12, wherein the illuminating step varies the light pattern over an ultraviolet light spectrum.

* * * * *